(12) United States Patent
Furukawa (10) Patent No.: US 8,229,277 B2
(45) Date of Patent: Jul. 24, 2012

(54) VIDEO PROCESSING APPARATUS, METHOD, AND STORAGE MEDIUM

(75) Inventor: Takeshi Furukawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 722 days.

(21) Appl. No.: 12/271,727

(22) Filed: Nov. 14, 2008

(65) Prior Publication Data
US 2009/0129744 A1 May 21, 2009

(30) Foreign Application Priority Data

Nov. 16, 2007 (JP) ................................. 2007-298172

(51) Int. Cl.
*H04N 5/94* (2006.01)

(52) U.S. Cl. ...................................................... 386/263

(58) Field of Classification Search .................. None
See application file for complete search history.

(56) References Cited

U.S. PATENT DOCUMENTS

| 6,862,045 B2 | 3/2005 | Morimoto et al. | |
|---|---|---|---|
| 2003/0081936 A1* | 5/2003 | Kim | 386/46 |

FOREIGN PATENT DOCUMENTS

JP 2002-118844 4/2002

* cited by examiner

*Primary Examiner* — William C Vaughn, Jr.
*Assistant Examiner* — Daniel Tekle
(74) *Attorney, Agent, or Firm* — Canon USA Inc. IP Division (57) ABSTRACT

A video processing apparatus includes a packet generation unit configured to receive a frame of video data, to divide the frame into tiles, and to packetize each of the tiles, a setting unit configured to set a processing time of each packet generated by the packet generation unit, a processing unit configured to perform image processing on each packet, a measurement unit configured to measure a processing time of the image processing performed by the processing unit, a determination unit configured to determine a processing speed of the processing unit based on a result of comparison between the processing time of each packet set by the setting unit and the processing time measured by the measurement unit, and an output unit configured to combine the packets processed by the processing unit to output video data.

6 Claims, 9 Drawing Sheets

|  | PROCESSING TIME [T] | | | |
| --- | --- | --- | --- | --- |
|  | PACKET GENERATION FUNCTION UNIT 1100 | PACKET PROCESSING FUNCTION UNIT 1200 | PACKET PROCESSING FUNCTION UNIT 1300 | PACKET PROCESSING FUNCTION UNIT 1400 |
| PACKET DATA 00 | 5 | 10 | 10 | 10 |
| PACKET DATA 01 | 5 | 15 | 10 | 10 |
| PACKET DATA 10 | 5 | 25 | 10 | 10 |
| PACKET DATA 11 | 5 | 30 | 10 | 10 |

FIG.6

| mode | PROCESSING TIME RATIO |
|---|---|
| 0 | 100 |
| 1 | 90 |
| 2 | 80 |
| 3 | 70 |
| 4 | 60 |
| 5 | 50 |

HEADER INFORMATION OF PACKET DATA 00

TIME 5 — 8020
| | port | mode | forecast time | actual time |
|---|---|---|---|---|
| +00 | 0 | 0 | 10 | — |
| +04 | 0 | 0 | 10 | — |
| +08 | 0 | 0 | 10 | — |

TIME 15 — 8030
| | port | mode | forecast time | actual time |
|---|---|---|---|---|
| +00 | 0 | 0 | 10 | 10 |
| +04 | 0 | 0 | 10 | — |
| +08 | 0 | 0 | 10 | — |

TIME 25 — 8040
| | port | mode | forecast time | actual time |
|---|---|---|---|---|
| +00 | 0 | 0 | 10 | 10 |
| +04 | 0 | 0 | 10 | 10 |
| +08 | 0 | 0 | 10 | — |

TIME 35 — 8050
| | port | mode | forecast time | actual time |
|---|---|---|---|---|
| +00 | 0 | 0 | 10 | 10 |
| +04 | 0 | 0 | 10 | 10 |
| +08 | 0 | 0 | 10 | 10 |

HEADER INFORMATION OF PACKET DATA 01

TIME 10 — 8120
| | port | mode | forecast time | actual time |
|---|---|---|---|---|
| +00 | 0 | 0 | 10 | — |
| +04 | 0 | 0 | 10 | — |
| +08 | 0 | 0 | 10 | — |

TIME 30 — 8130
| | port | mode | forecast time | actual time |
|---|---|---|---|---|
| +00 | 0 | 0 | 10 | 15 |
| +04 | 0 | 0 | 10 | — |
| +08 | 0 | 0 | 10 | — |

TIME 40 — 8140
| | port | mode | forecast time | actual time |
|---|---|---|---|---|
| +00 | 0 | 0 | 10 | 15 |
| +04 | 0 | 0 | 10 | 10 |
| +08 | 0 | 0 | 10 | — |

TIME 50 — 8150
| | port | mode | forecast time | actual time |
|---|---|---|---|---|
| +00 | 0 | 0 | 10 | 15 |
| +04 | 0 | 0 | 10 | 10 |
| +08 | 0 | 0 | 10 | 10 |

HEADER INFORMATION OF PACKET DATA 10

TIME 20 — 8220
| | port | mode | forecast time | actual time |
|---|---|---|---|---|
| +00 | 0 | 0 | 10 | — |
| +04 | 0 | 0 | 10 | — |
| +08 | 0 | 0 | 10 | — |

TIME 55 — 8230
| | port | mode | forecast time | actual time |
|---|---|---|---|---|
| +00 | 0 | 0 | 10 | 25 |
| +04 | 0 | 0 | 10 | — |
| +08 | 0 | 0 | 10 | — |

TIME 65 — 8240
| | port | mode | forecast time | actual time |
|---|---|---|---|---|
| +00 | 0 | 0 | 10 | 25 |
| +04 | 0 | 0 | 10 | 10 |
| +08 | 0 | 0 | 10 | — |

TIME 75 — 8250
| | port | mode | forecast time | actual time |
|---|---|---|---|---|
| +00 | 0 | 0 | 10 | 25 |
| +04 | 0 | 0 | 10 | 10 |
| +08 | 0 | 0 | 10 | 10 |

HEADER INFORMATION OF PACKET DATA 11

TIME 55 — 8320
| | port | mode | forecast time | actual time |
|---|---|---|---|---|
| +00 | 0 | 4 | 6 | — |
| +04 | 0 | 0 | 10 | — |
| +08 | 0 | 0 | 10 | — |

TIME 70 — 8330
| | port | mode | forecast time | actual time |
|---|---|---|---|---|
| +00 | 0 | 4 | 6 | 18 |
| +04 | 0 | 0 | 10 | — |
| +08 | 0 | 0 | 10 | — |

TIME 80 — 8340
| | port | mode | forecast time | actual time |
|---|---|---|---|---|
| +00 | 0 | 4 | 6 | 18 |
| +04 | 0 | 0 | 10 | 10 |
| +08 | 0 | 0 | 10 | — |

TIME 90 — 8350
| | port | mode | forecast time | actual time |
|---|---|---|---|---|
| +00 | 0 | 4 | 6 | 18 |
| +04 | 0 | 0 | 10 | 10 |
| +08 | 0 | 0 | 10 | 10 |

FIG.9
PRIOR ART

VIDEO PROCESSING APPARATUS, METHOD, AND STORAGE MEDIUM

BACKGROUND OF THE INVENTION

1. Field of the Invention

The present invention relates to a video processing apparatus which executes image processing, more specifically, image processing of an image for each tile and a video processing method.

2. Description of the Related Art

Generally, in a video processing system, a video output unit such as a display needs to output synchronized video image and audio data. That is, the video output unit must synchronize the output timing of a video image and audio to coincide with each other.

In order to allow a video image and audio to be synchronized, Moving Picture Experts Group Phase 1 (MPEG-1) and Moving Picture Experts Group Phase 2 (MPEG-2), which are an international standard coding system, add a time stamp, which indicates timing information, to a packet header.

Figure 9:
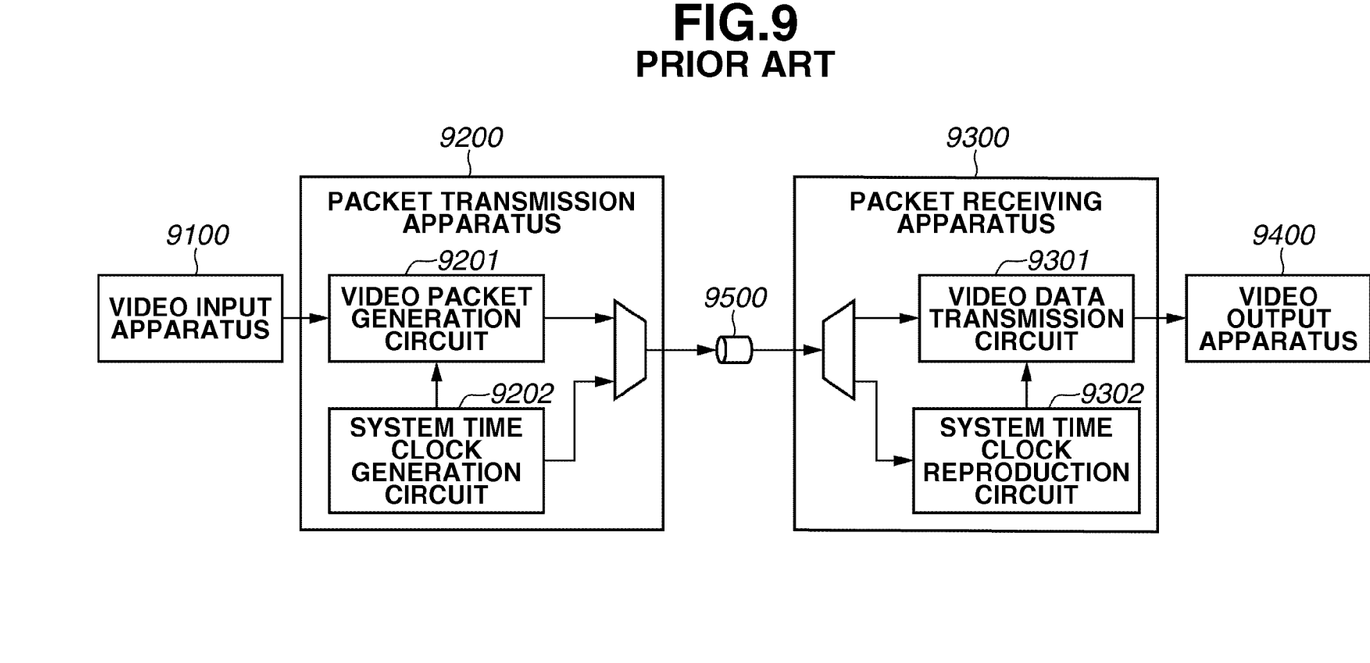
FIG. 9 is a prior art block diagram illustrating a conventional video processing system.

FIG. 9 illustrates a prior art block diagram of a conventional video processing system. The video processing system includes a packet transmission apparatus 9200 and a packet receiving apparatus 9300.

The packet transmission apparatus 9200 includes a video packet generation circuit 9201 and a system time clock generation circuit 9202. The video packet generation circuit 9201 receives video data from a video input apparatus 9100 and packetizes the video data to be transmitted. At this time, the video packet generation circuit 9201 generates a time stamp based on a time indicated by the system time clock generation circuit 9202 and adds the time stamp to a packet header.

The packet receiving apparatus 9300 receives the packet transmitted by the packet transmission apparatus 9200 via a packet transmission path 9500.

The packet receiving apparatus 9300 includes a video data transmission circuit 9301 and a system time clock reproduction circuit 9302. The video data transmission circuit 9301 receives the packet. When a time indicated by the system time clock reproduction circuit 9302 and a time indicated by the time stamp added to the packet header coincide with each other, the video data transmission circuit 9301 restores video data to transmit it to a video output apparatus 9400.

The time from when the packet transmission apparatus 9200 transmits a packet to when the packet receiving apparatus 9300 receives the packet is constant according to a system. Thus, a time stamp can be generated based on the system time clock generation circuit 9202.

In a conventional video processing system, the time from when a packet transmission apparatus transmits a packet to when a packet receiving apparatus receives the packet is constant according to a system. Therefore, the packet arrives at the packet receiving apparatus at a time indicated by a time stamp.

However, if a packet processing apparatus, which performs, for example, high quality processing, is provided between the packet transmission apparatus and the packet receiving apparatus, a packet may not arrive at the packet receiving apparatus at a time indicated by a time stamp. That is, when the packet processing apparatus accesses an external memory or the like, processing capability of the packet processing apparatus may significantly be reduced due to congestion of access and the packet may not arrive at an estimated time. Accordingly, video data cannot be output at a time indicated by a time stamp. This may cause a disturbance in a video image.

SUMMARY OF THE INVENTION

An exemplary embodiment of the present invention is directed to a video processing apparatus capable of reducing a disturbance in an image due to arrival delay of a packet.

According to an aspect of the present invention, a video processing apparatus includes a packet generation unit configured to receive a frame of video data, to divide the frame into tiles, and to packetize each of the tiles, a setting unit configured to set a processing time of each packet generated by the packet generation unit, a processing unit configured to perform image processing on each packet, a measurement unit configured to measure a processing time of the image processing performed by the processing unit, a determination unit configured to determine a processing speed of the processing unit based on a result of comparison between the processing time of each packet set by the setting unit and the processing time measured by the measurement unit, and an output unit configured to combine the packets processed by the processing unit to output video data.

According to an exemplary embodiment of the present invention, a disturbance in an image due to an arrival delay of a packet can be reduced.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DETAILED DESCRIPTION OF THE EMBODIMENTS

Various exemplary embodiments, features, and aspects of the invention will be described in detail below with reference to the drawings.

Figure 1:
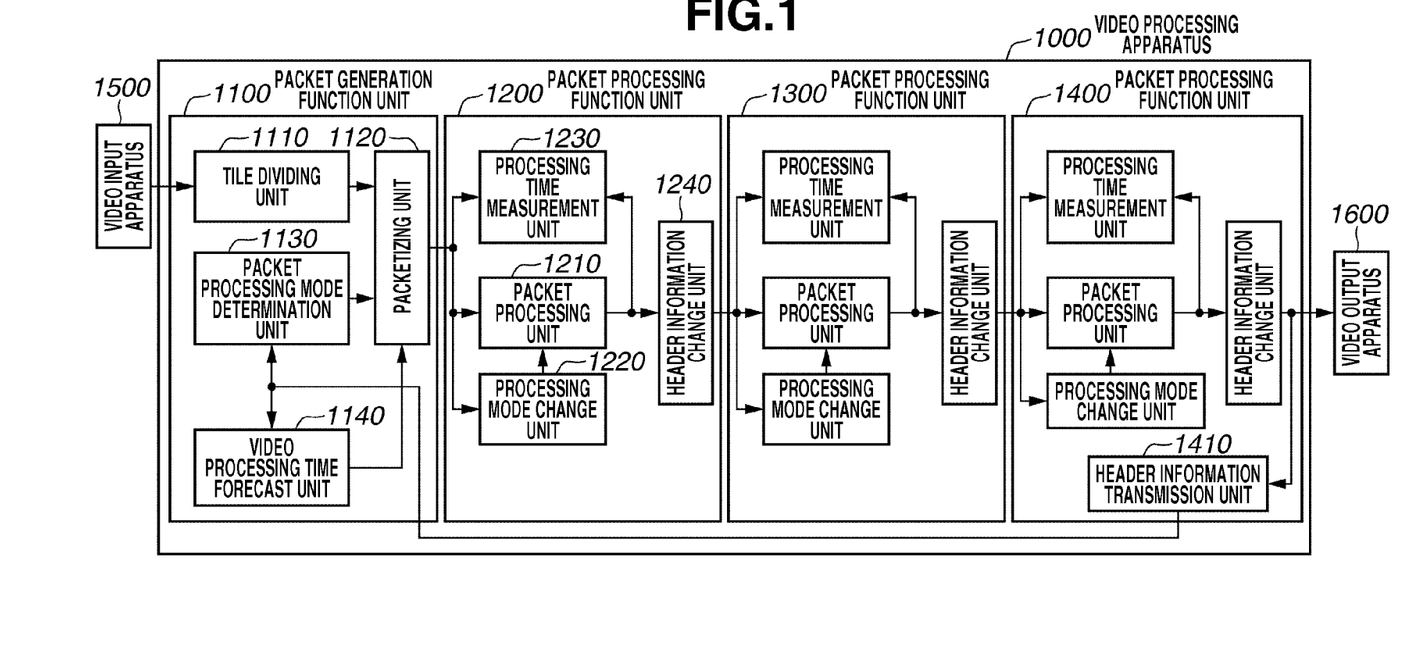
FIG. 1 is a block diagram illustrating a video processing apparatus according to a first exemplary embodiment of the present invention.

FIG. 1 is a block diagram illustrating a configuration of the main part of a video processing apparatus according to a first exemplary embodiment of the present invention. A video processing apparatus 1000 performs video processing, such as high image quality processing, on video data input from a video input apparatus 1500 and outputs it to a video output apparatus 1600. The video processing apparatus 1000 includes a packet generation function unit 1100 configured to divide data input from the video input apparatus 1500 into tiles to packetize each tile, and packet processing function units 1200, 1300, and 1400 configured to execute video processing on packet data generated by the packet generation function unit 1100 for each packet. In the present exemplary embodiment, the packet processing function unit includes three packet processing function units but may include only one packet processing function unit.

The packet generation function unit 1100 includes a tile dividing unit 1110, a packetizing unit 1120, a packet processing mode determination unit 1130, and a video processing time forecast unit 1140. The tile dividing unit 1110 divides input video data into rectangular areas shaped like a tile. The packetizing unit 1120 adds header information to the divided tile data to generate packet data. The packet processing mode determination unit 1130 determines a packet processing mode (described below) which is written in the header information. The video processing time forecast unit 1140 forecasts a video processing time, which is also written in the header information.

The packet processing function units 1200, 1300, and 1400 each include a packet processing unit 1210, a processing mode change unit 1220, a processing time measurement unit 1230, and a header information change unit 1240. The packet processing unit 1210 performs video image processing on input packet data. The processing mode change unit 1220 changes the processing mode of the packet processing unit 1210 based on the header information of the packet data. The processing time measurement unit 1230 measures the processing time of the packet data. The header information change unit 1240 adds the measured processing time to the header information.

Further, when a plurality of packet processing function units is included, a packet processing function unit with the last processing order includes the following configuration. That is, the packet processing function unit 1400 further includes a header information transmission unit 1410, which is configured to transmit the header information, in which the processing time is written, to the packet generation function unit 1100. The processing time is measured by the respective packet processing function units 1200, 1300, and 1400.

Figure 2:
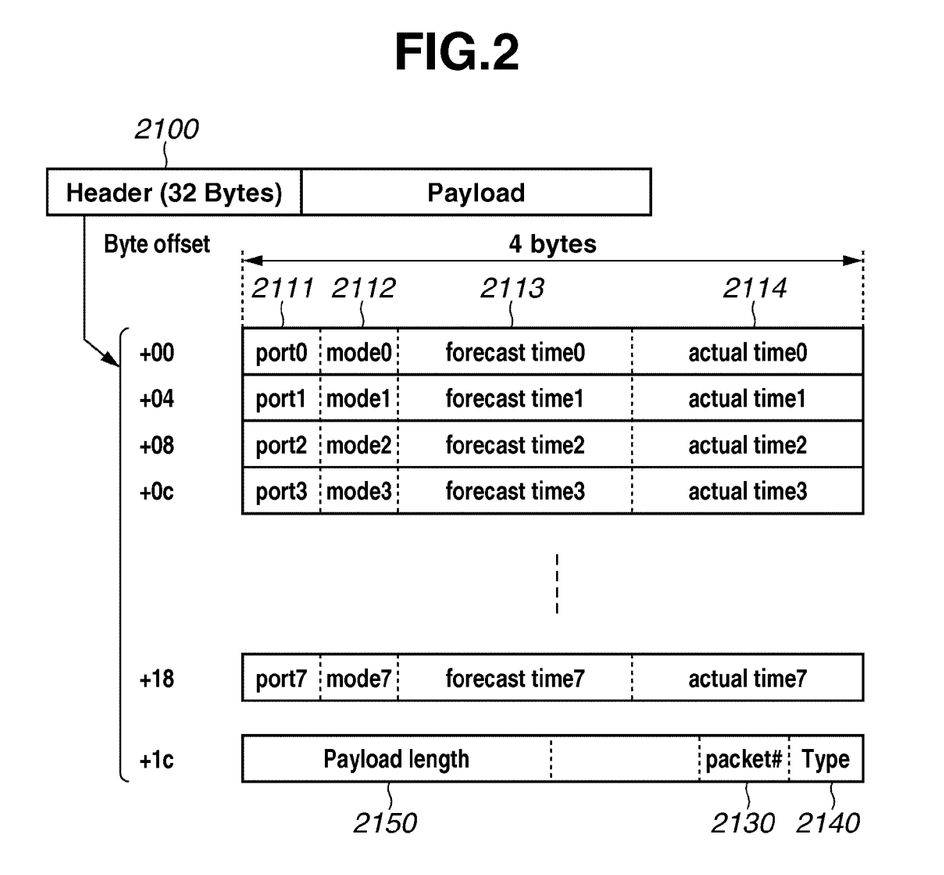
FIG. 2 is a diagram illustrating a configuration example of header information to be added to a tile.
Figure 3:
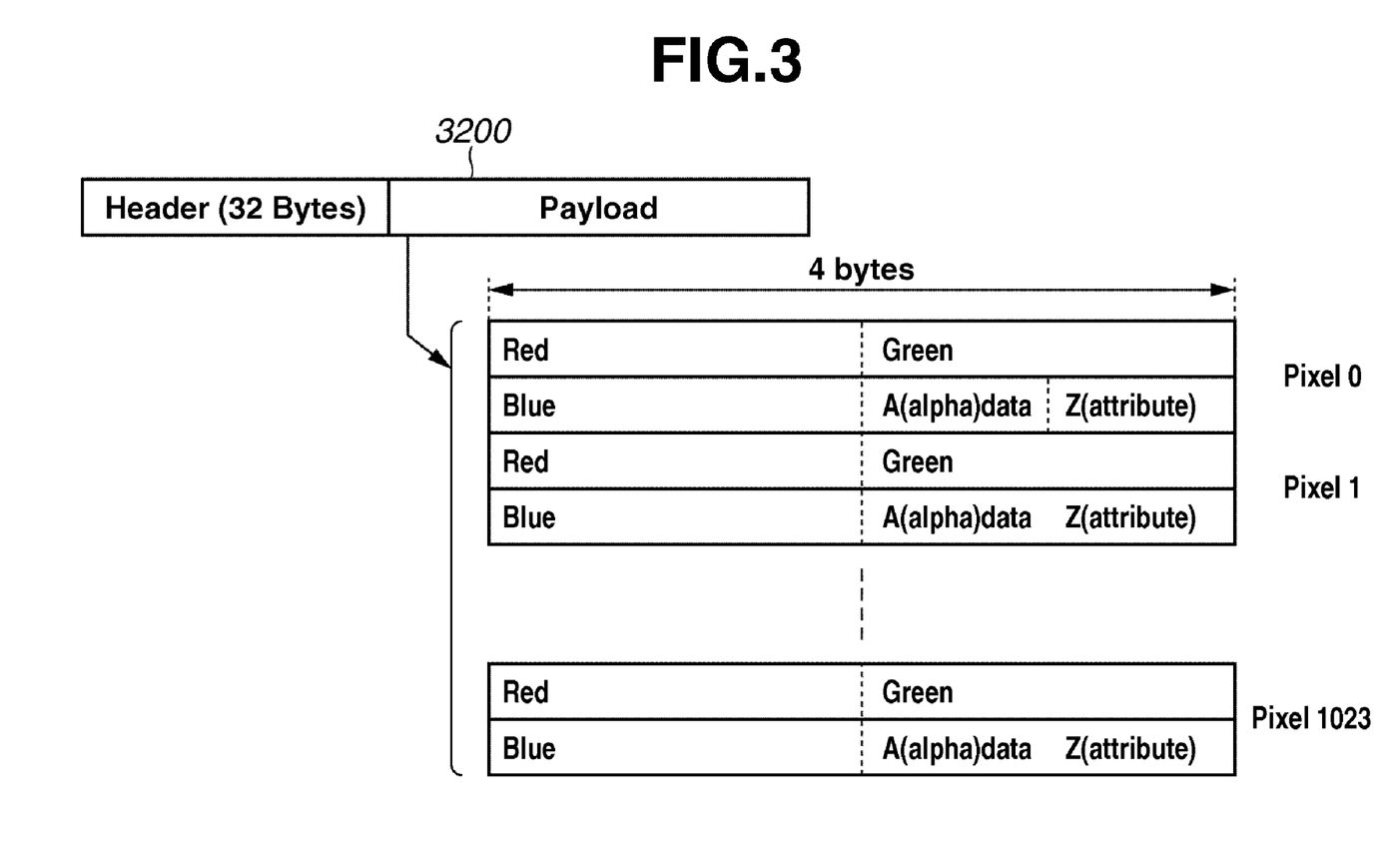
FIG. 3 is a diagram illustrating a configuration example of payload data to be added to a tile.

FIGS. 2 and 3 illustrate a configuration of the above-described packet data according to the first exemplary embodiment of the present invention. The packet data includes header information 2100 and data payload 3200 of video data. A configuration example of the header information 2100 is illustrated in FIG. 2 and a configuration example of the data payload 3200 is illustrated in FIG. 3.

The header information 2100 includes forecast video processing time (forecast time) 2113 and measured processing time of packet data (actual time) 2114. In the header information 2100, four fields are stored, such as a port 2111 that indicates a port, a processing mode 2112 that indicates a processing mode (described below), the forecast video processing time (forecast time) 2113, and the measured processing time of packet data (actual time) 2114. In addition, the header information 2100 includes a payload length 2150 that indicates the number of bytes of data payload, a packet#2130 that indicates a packet number in a frame of video data, and a Type 2140 that indicates the type of packets.

The data payload 3200 stores, for example, video data whose size is 8 pixels×128 pixels. The size of the data payload 3200 is 8 K bytes. Each pixel data has 8 bytes and includes 16-bit RGB data having red, green, and blue data represented by Adobe RGB, 8-bit alpha data, and 8-bit attribute data.

Figure 4:
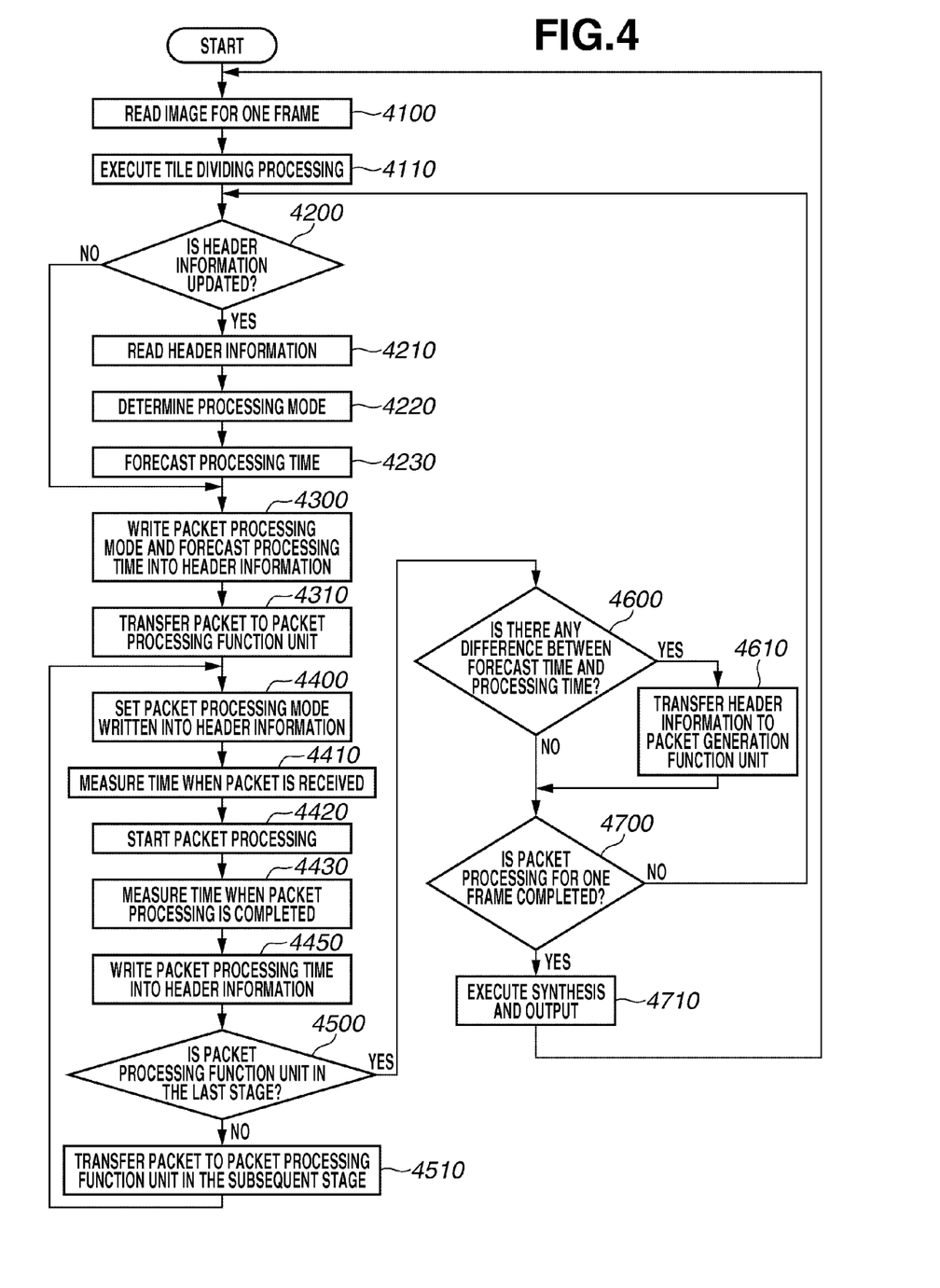
FIG. 4 is a flowchart illustrating processing performed by the video processing apparatus according to the first exemplary embodiment.

FIG. 4 is a flowchart illustrating image processing performed by the video processing apparatus 1000 according to the present exemplary embodiment.

Processing of Packet Data 00

In step 4100, video data for one frame is input from the video input apparatus 1500 to the video processing apparatus 1000. The packet generation function unit 1100 executes reading of video data.

In step 4110, the tile dividing unit 1110 divides the input video data into rectangular areas (hereinafter, referred to as tile data). In the present exemplary embodiment, video data for one frame is divided into four tile data. The tile dividing unit 1110 divides the input video data into tile data 00, 01, 10, and 11.

In step 4200, the packetizing unit 1120 executes confirmation as to whether header information is updated by a packet processing function unit of the last stage which will be described below. Since it is an initial state at first, updating of header information is not executed (NO in step 4200) The processing then proceeds to step 4300.

In step 4300, the packetizing unit 1120 writes the processing mode 2112 and the forecast video processing times 2113 of the respective packet processing function units 1200, 1300, and 1400 into header information of the above-described tile data to generate packet data.

Figure 6:
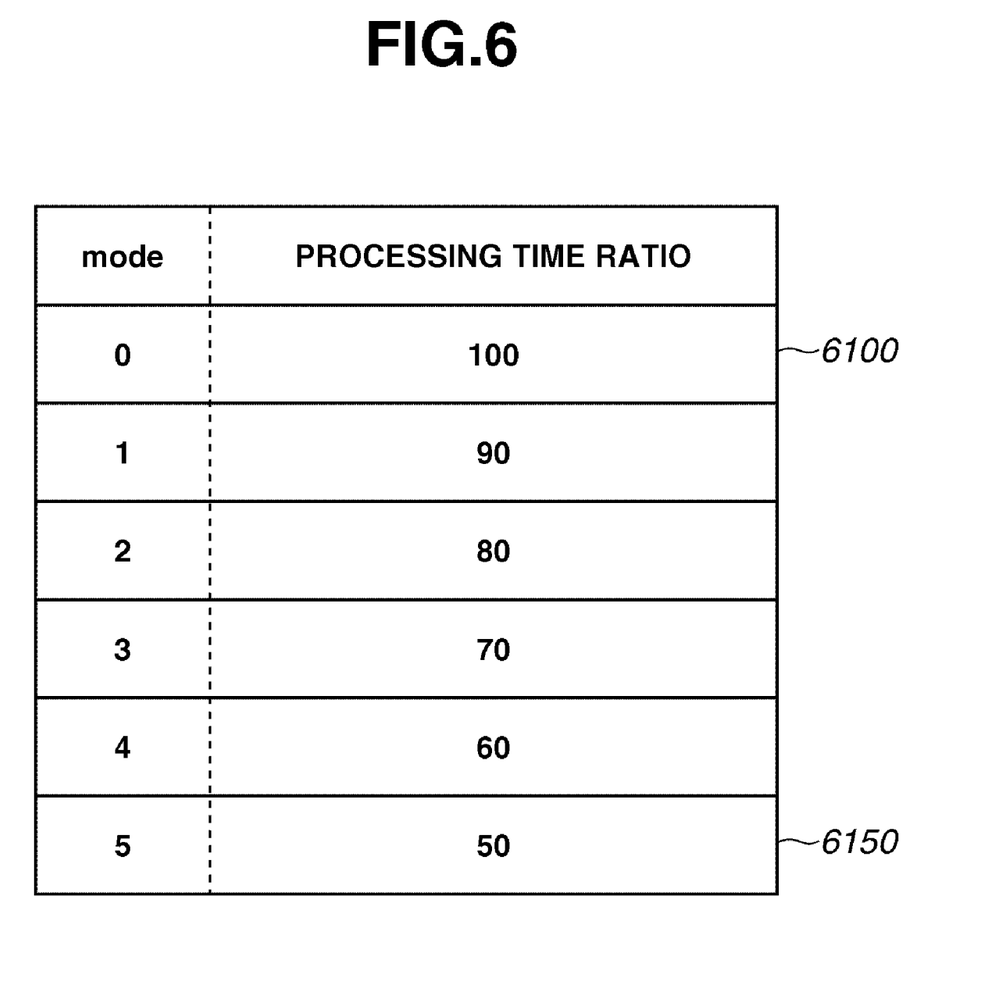
FIG. 6 is a diagram illustrating an example of a changing rate of processing time for each processing mode.

The processing mode 2112 and the forecast video processing time 2113 are determined by the packet processing mode determination unit 1130 and the video processing time forecast unit 1140. Herein, according to the processing mode, a processing speed of the packet processing function unit is changeable for the processing time of a packet in each packet processing function unit. FIG. 6 illustrates a speed ratio in processing time for each processing mode. For example, it is indicated that a mode 5 (6150) executes packet processing at a double speed as compared with a mode 0 (6100). Since it is an initial state at first, the processing mode 2112 of all packet processing function units 1200, 1300, and 1400 is set at 0, which is an initial value. Further, the forecast video processing time 2113 also is set at 10 [T], which is an initial value. Note that the video output apparatus 1600 according to the present exemplary embodiment receives video data of one packet for every 15 [T] and outputs data of a frame (for four packets) for every 60 [T]. Accordingly, each of the packet processing function units 1200, 1300, and 1400 must execute image processing within 15 [T]. Therefore, the initial value of the forecast video processing time 2113 is desirable to be 10 [T] in consideration of some allowance. Note that the packet processing function units 1200, 1300, and 1400 do not always complete image processing within the forecast video processing time 2113.

Figure 5:
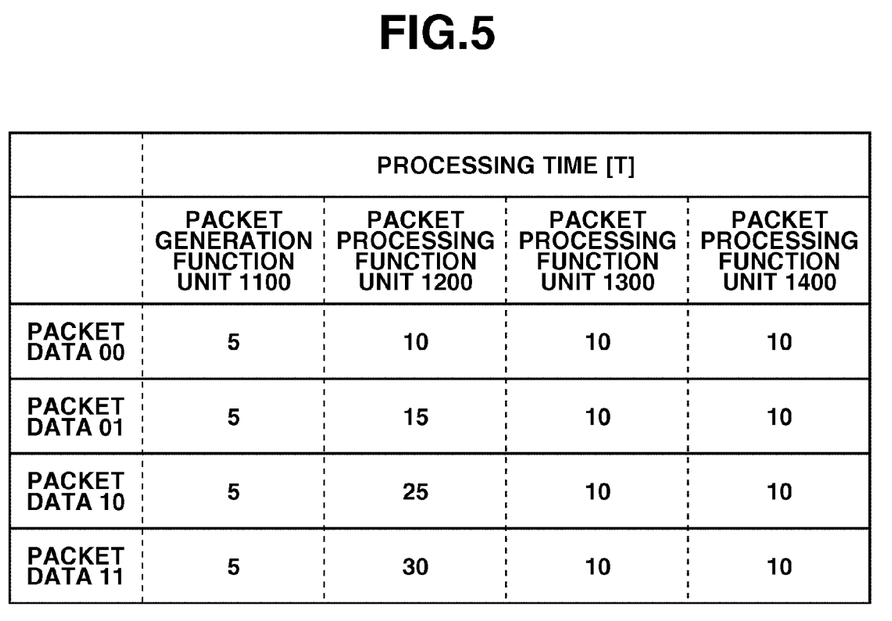
FIG. 5 is a diagram illustrating an example of packet processing time.

FIG. 5 illustrates the times required for processing the respective packet data 00, 01, 10, and 11. As illustrated in FIG. 5, the processing of the packet data 00 is completed at the elapse of the forecast video processing time, since the video processing time in each packet processing function unit is 10 [T]. However, with respect to the packet data 01, 10, and 11, 15 [T], 25 [T], and 30 [T] are required for the time of image processing to be executed in the packet processing function unit 1200, respectively. The present exemplary embodiment will be described using packet data that requires processing time as illustrated in FIG. 5.

Referring back to the flowchart in FIG. 4, in step 4310, the packet generation function unit 1100 transfers the generated packet data to the packet processing function unit 1200.

Figure 7:
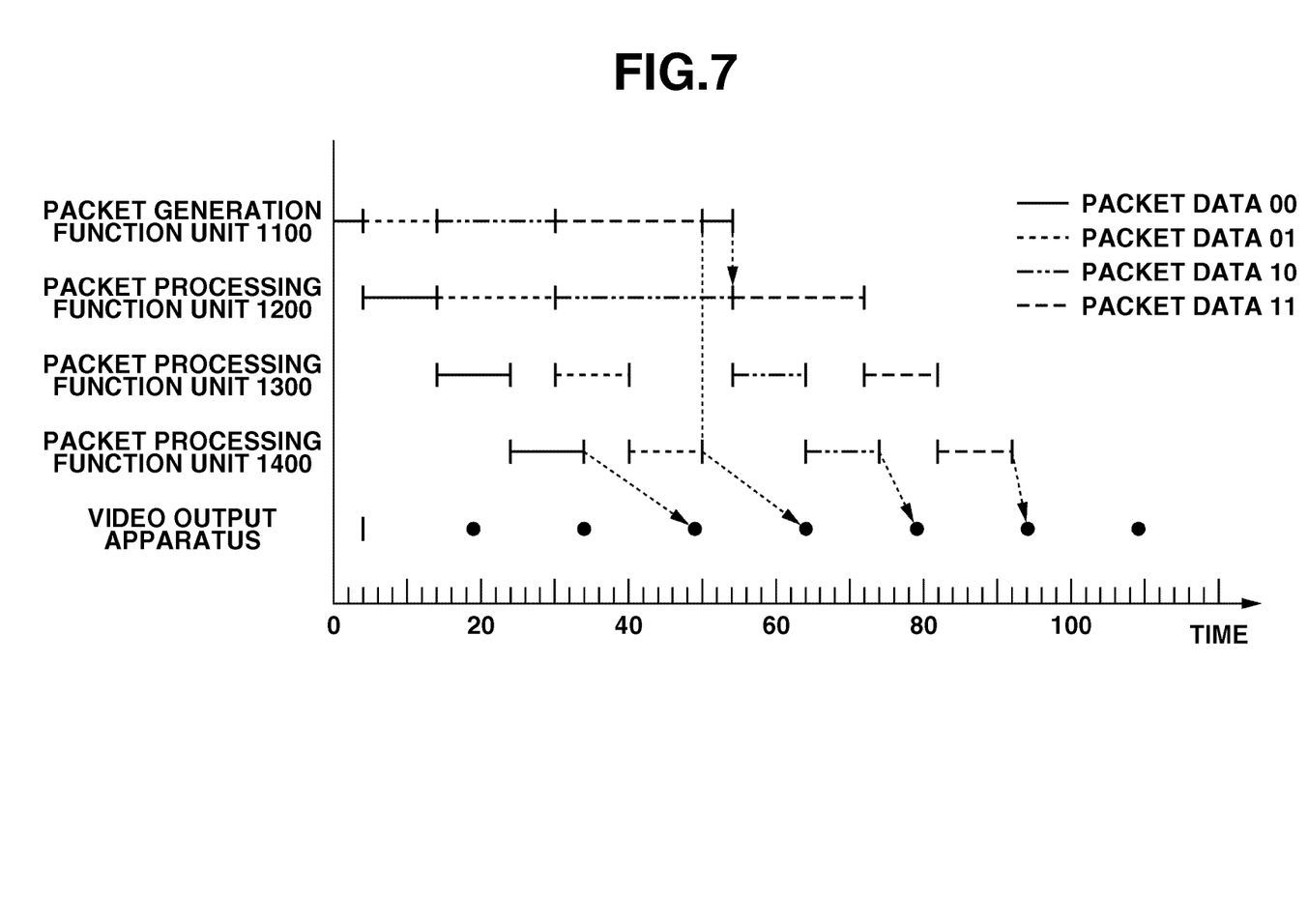
FIG. 7 is a diagram illustrating a processing state of a packet generation function unit and a packet processing apparatus in relation with elapsed time according to the first exemplary embodiment.

FIG. 7 is a diagram illustrating a state of the packet generation function unit 1100 and the packet processing function units 1200, 1300, and 1400 in relation with elapsed time. Referring to FIG. 5, the time required for the packet generation function unit 1100 to generate the packet data 00 is 5 [T]. Accordingly, as illustrated in FIG. 7, the packet processing function unit 1200 receives the packet data 00 at time 5 [T].

Figure 8:
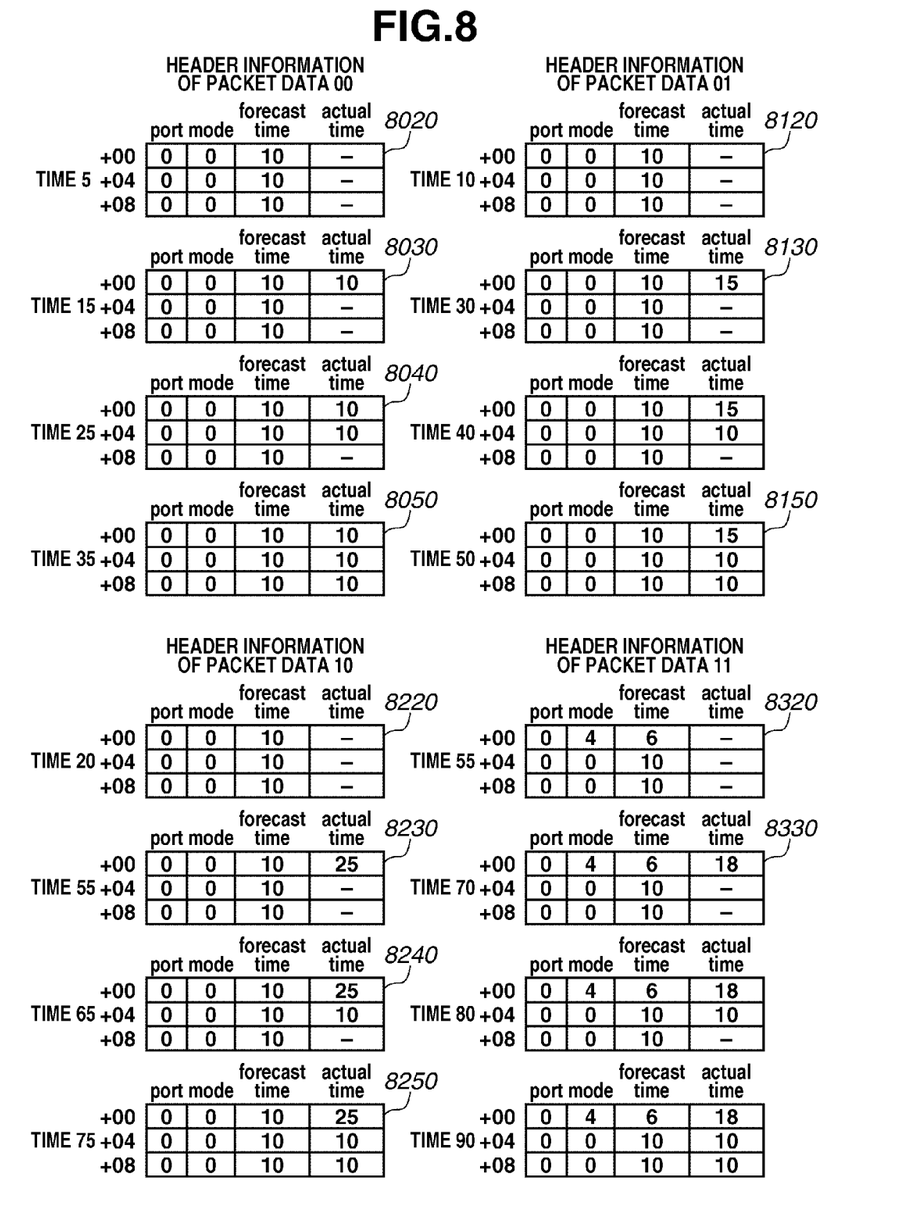
FIG. 8 is a diagram illustrating a transition state of header information.

Further, in FIG. 8, a transition state of header information of each packet data is illustrated. The header information of the packet data 00 at time 5 [T] is in a state of an initial value, the processing mode is 0, and the forecast processing time is 10. Thus, this corresponds to a state of table 8020 illustrated in FIG. 8.

In step 4400, the processing mode change unit 1220 of the packet processing function unit 1200 acquires a processing mode from header information of the received packet data and sets the processing mode of the packet processing unit 1210. Since the processing mode is 0, the processing mode 0 is set in the packet processing unit 1210.

In step 4410, the processing time measurement unit 1230 of the packet processing function unit 1200 starts to measure a processing time at time 5 [T] when receiving the packet.

In step 4420, the packet processing unit 1210 of the packet processing function unit 1200 starts processing of the packet data 00. The processing mode is set to be 0 in step 4400. Referring to FIG. 5, the time required for the packet processing function unit 1200 to process the packet data 00 is 10 [T].

In step 4430, the processing time measurement unit 1230 of the packet processing function unit 1200 measures processing completion time of the packet data 00.

In step 4450, the header information change unit 1240 of the packet processing function unit 1200 writes the processing time measured by the processing time measurement unit 1230 into the processing time 2114 of the header information. The header information shifts to a state of table 8030 illustrated in FIG. 8.

In step 4500, the video processing apparatus 1000 determines whether a packet processing function unit that is currently processing the packet data is in the last stage. Since the packet processing function unit 1200 is not in the last stage (NO in step 4500), the processing proceeds to step 4510.

In step 4510, the packet processing function unit 1200 transfers the packet data 00 to the packet processing function unit 1300. FIG. 7 indicates that the packet processing function unit 1200 transfers the packet data 00 at time 15 [T]. Then, the processing returns to step 4400.

The packet processing function unit 1300 also executes the processing from step 4400 to step 4450. The processing mode is set at 0. It is measured that the processing of the packet data 00 requires 10 [T]. Into the header information, 10 [T] is written. The header information is in a state of table 8040 at time 25 [T] illustrated in FIG. 8.

In step 4500 again, the video processing apparatus 1000 determines whether a packet processing function unit that is currently processing the packet data is in the last stage. Since the packet processing function unit 1300 is also not in the last stage (NO in step 4500), the processing proceeds to step 4510. In step 4510, the packet processing function unit 1300 transmits the packet data 00 to the packet processing function unit 1400 at time 25 [T]. Then, the processing returns to step 4400.

The packet processing function unit 1400 also executes processing from step 4400 to step 4450. The header information of the packet data 00 is in a state of table 8050 at time 35 [T].

In step 4500 again, the video processing apparatus 1000 determines whether a packet processing function unit that is currently processing the packet data is in the last stage. Since the packet processing function unit 1400 is in the last stage (YES in step 4500), the processing proceeds to step 4600.

In step 4600, the video processing apparatus 1000 compares the forecast video processing time 2113 written in the header information and the processing time 2114. If there is a difference therebetween (YES in step 4600), the processing proceeds to step 4610. With respect to the packet data 00, since there is no difference between the forecast video processing time 2113 and the processing time 2114 (NO in step 4600), the processing proceeds to step 4700.

In step 4700, the video processing apparatus 1000 determines whether packet processing for one frame is completed. At time 50 [T], the packet processing for one frame is not completed (NO in step 4700), the processing returns to step 4200.

Processing of Packet Data 01 and 10

The packet generation function unit 1100 and the packet processing function units 1200, 1300, and 1400 in the video processing apparatus 1000 according to the present exemplary embodiment have a pipeline structure. Therefore, at time 5 [T] when the packet generation function unit 1100 has completed transferring the packet data 00 to the packet processing function unit 1200, the packet generation function unit 1100 starts processing packet data 01. The processing of the packet data 01 will be described according to the flowchart illustrated in FIG. 4.

In step 4200, the packetizing unit 1120 determines whether the header information is updated. Since at time 5 [T], the header information is not updated (NO in step 4200), the processing proceeds to step 4300.

In step 4300, similar to the packet data 00, in the processing mode 2112 and the forecast video processing time 2113, an initial value is used. Accordingly, 0 is set in the processing mode 2112 that indicates a processing mode, and 10 [T] is set in the forecast video processing time 2113. Accordingly, the header information is in a state of table 8120 illustrated in FIG. 8.

In step 4310, the packet generation function unit 1100 transfers the packet data 01 to the packet processing function unit 1200. Note that at time 10 [T] when the packet generation function unit 1100 has completed the generation of the packet, the packet processing function unit 1200 is executing the processing of the packet data 00. Therefore, the time when the packet generation function unit 1100 can transfer the packet data 01 to the packet processing function unit 1200 is time 15 [T].

In step 4400, the processing mode change unit 1220 of the packet processing function unit 1200 acquires a processing mode from the header information of the received packet data and sets the processing mode of the packet processing unit 1210.

In step 4410, the processing time measurement unit 1230 of the packet processing function unit 1200 starts measurement of the processing time.

In step 4420, the packet processing unit 1210 of the packet processing function unit 1200 starts processing the packet data 01. As illustrated in FIG. 5, the packet processing function unit 1200 requires a processing time of 15 [T] to process the packet data 01.

In step 4430, the processing time measurement unit 1230 of the packet processing function unit 1200 measures time when processing of the packet data 01 is completed.

In step 4450, the header information change unit 1240 of the packet processing function unit 1200 writes the packet processing time 15 [T] into the processing time 2114 of the header information. The header information is in a state of table 8130 illustrated in FIG. 8.

In step 4500, the video processing apparatus 1000 determines whether a packet processing function unit that is currently processing the packet data is in the last stage. Since the packet processing function unit 1200 is not in the last stage (NO in step 4500), the processing proceeds to step 4510. In step 4510, at time 20 [T], the packet processing function unit 1200 transmits the packet data 01 to the packet processing function unit 1300. Then, the processing returns to step 4400.

The packet processing function unit 1300 also executes processing from step 4400 to step 4450. The time when the packet processing function unit 1300 can complete processing of the packet data 01 and transfer the packet data 01 to the packet processing function unit 1400 is time 40 [T].

Then, in step 4500, the video processing apparatus 1000 determines whether a packet processing function unit that is currently processing the packet data is in the last stage. Since the packet processing function unit 1300 is not in the last stage (NO in step 4500), the processing proceeds to step 4510. In step 4510, at time 40 [T], the packet processing function unit 1300 transmits the packet data 01 to the packet processing function unit 1400. Then, the processing returns to step 4400.

The packet processing function unit 1400 also executes processing from step 4400 to step 4450.

Then, in step 4500, the video processing apparatus 1000 determines whether a packet processing function unit that is currently processing the packet data is in the last stage. Since the packet processing function unit 1400 is in the last stage (YES in step 4500), the processing proceeds to step 4600.

In step 4600, the video processing apparatus 1000 compares the forecast video processing time 2113 written in the header information and the processing time 2114. The time when the packet processing function unit 1400 has completed processing is 50 [T]. The header information of the packet data 01 at time 50 [T] is in a state of table 8150.

Since the forecast video processing time 2113 and the processing time 2114 of the packet processing function unit 1200 are 10 [T] and 15 [T], respectively, it is determined that there is a difference therebetween (YES in step 4600). Then, the processing proceeds to step 4610.

In step 4610, the header information transmission unit 1410 of the packet processing function unit 1400 transmits the header information of the packet data 01, where there is a difference between the forecast video processing time and the processing time, to the packet generation function unit 1100.

In step 4700, the video processing apparatus 1000 determines whether packet processing for one frame has been completed. Since, at time 50 [T], the packet processing for one frame is not completed (NO in step 4700), the processing returns to step 4200, in which processing of the packet data 10 is executed.

In step 4200, the packetizing unit 1120 executes confirmation as to whether the header information is updated by a packet processing function unit in the last stage. As described above, updating of the packet information is executed at time 50 [T] when the packet data 01 is processed. Note that since the processing of the packet data 10 has started before the time 50 [T] and updating of the packet information is not executed, the processing of the packet data 10 is executed similar to the above-described processing of the packet data 01. The header information of the packet data 10 shifts from a state of table 8220 in FIG. 8 to a state of table 8250 through a state of table 8230 and a state of table 8240.

Processing of Packet Data 11

Next, processing of the packet data 11 that is processed after the time 50 [T] when updating of the header information has been completed will be described.

In step 4200, since the header information is updated (YES in step 4200), the processing proceeds to step 4210.

In step 4210, the packet processing mode determination unit 1130 executes reading of the updated header information. The header information received by the packet generation function unit 1100 is in a state of table 8150 illustrated in FIG. 8.

In step 4220, the packet processing mode determination unit 1130 determines a processing mode based on the updated header information.

In the state of table 8150 illustrated in FIG. 8, while the forecast video processing time 2113 of the packet processing function unit 1200 is 10 [T], the processing time 2114 is 15 [T]. On the other hand, with respect to the packet processing function unit 1300 and the packet processing function unit 1400, there is no difference therebetween. In the present exemplary embodiment, the packet processing mode determination unit 1130 determines a processing mode based on a difference relative to a forecast video processing time as illustrated in the following equations (1) and (2).

$$\text{forecast processing time/actual time} \times 100 \qquad (1)$$

Based on the above equation, the processing mode of the packet processing function unit 1200 is determined.

$$10/15 \times 100 \approx 67 \qquad (2)$$

In order to make a processing time ratio to be 67 or smaller, referring to each processing time ratio for each processing mode illustrated in FIG. 6, the packet processing mode determination unit 1130 selects mode 4.

In step 4230, the video processing time forecast unit 1140 forecasts the forecast video processing time 2113. In the present exemplary embodiment, it is assumed that each packet processing function unit completes processing in a time 10 [T]. Consequently, since the mode 4 is selected, the video processing time forecast unit 1140 determines the forecast video processing time 2113 to be 6 [T] based on the following equation (3).

$$10\,[T] \times 0.6\,(\text{mode 4}) = 6\,[T] \qquad (3)$$

Note that the forecast video processing time 2113 can be calculated using the processing time 2114 of the header information directly just after updating or can be calculated based on an average of the processing time 2114 of the header information. Further, with respect to the packet processing function unit 1300 and the packet processing function unit 1400, since there is no difference between the forecast video processing time 2113 and the processing time 2114, the mode and the forecast video processing time 2113 are not changed.

Next, in step 4300, the packetizing unit 1120 writes header information into the header of packet data to generate packet data 11. The state of the header information is in a state of table 8320 illustrated in FIG. 8.

In step 4310, the packet generation function unit 1100 transfers the packet data 11 to the packet processing function unit 1200. The time when the packet data 11 is transferred is time 55 [T].

In step 4400, the processing mode change unit 1220 sets the processing mode 4, which is written in the header information of the packet data 11, to the packet processing unit 1210.

In step 4410, the processing time measurement unit 1230 starts the measurement of processing time.

In step 4420, the packet processing unit 1210 executes packet processing. As illustrated in FIG. 5, the packet processing function unit 1200 requires a time 30 [T] for processing the packet data 11 in the case of the mode 0. Note that since the mode 4 is set to the packet processing unit 1210, the packet processing unit 1210 completes the processing in 60% of the processing time in the mode 0.

In step 4430, the processing time measurement unit 1230 measures processing time required for packet processing. Since the mode 4 is set to the packet processing unit 1210, processing is completed in 18 [T], which is 60% of the processing time 30 [T] of the packet data 11, and the processing time measurement unit 1230 measures 18 [T] as the processing time.

In step 4450, the header information change unit 1240 writes the packet processing time 18 [T] into the processing time 2114 of the header information. The state of the header information is in a state of table 8330 illustrated in FIG. 8.

In step 4500, the video processing apparatus 1000 determines whether a packet processing function unit that is currently processing the packet data is in the last stage. Since the packet processing function unit 1200 is not in the last stage (NO in step 4500), the processing proceeds to step 4510. In step 4510, at time 73 [T], the packet processing function unit 1200 transfers the packet data 11 to the packet processing function unit 1300. Then, the processing returns to step 4400.

The packet processing function unit 1300 and the packet processing function unit 1400 also execute processing from step 4400 to step 4450.

Then, in step 4500, the video processing apparatus 1000 determines whether a packet processing function unit that is currently processing the packet data is in the last stage. Since the packet processing function unit 1400 is in the last stage (YES in step 4500), the processing proceeds to step 4600.

In step 4600, the video processing apparatus 1000 compares the forecast video processing time 2113 written in the header information and the processing time 2114. Similar to the proceeding of the packet data 10, there is a difference therebetween (YES in step 4600). Consequently, the processing proceeds to step 4610.

In step 4610, the header information transmission unit 1410 of the packet processing function unit 1400 transmits the header information to the packet generation function unit 1100.

In step 4700, the video processing apparatus 1000 determines whether processing for one frame is completed. In the present exemplary embodiment, one frame includes four packets. Upon completion of the packet data 11, packet processing for one frame is completed (YES in step S4700).

In step 4710, the video processing apparatus 1000 combines the processed packet data 00, 01, 10, and 11, and outputs the combined video data. The completion of processing of four packet data 00, 01, 10, and 11 is at time 93 [T]. As described above, the video output apparatus 1600 according to the present exemplary embodiment receives one packet of video data for each 15 [T] and outputs data of a frame (for four packets) for each 60 [T]. The time required for the first packet data 00 to be obtained is 5 [T]+15 [T]+15 [T]+15 [T]=50 [T] in an initial latency, and the time required for each of the packet data 01, 10, and 11 to be obtained is 15 [T]. The initial latency refers to the sum total of assumed processing times in the packet generation function unit 1100 and the packet processing function units 1200, 1300, and 1400. Consequently, processing of the first frame must be completed by time 95 [T]. In the present exemplary embodiment, since video processing for one frame is completed at time 93 [T], the video processing can be executed without causing any disturbance on a video image.

As described above, the video processing apparatus 1000 according to the present exemplary embodiment measures and feeds back the time required for image processing of each packet processing function unit, thereby allowing the video processing apparatus 1000 to select a processing mode suitable for each packet processing function unit.

This enables the video processing apparatus 1000 to reduce a disturbance of an image due to a delay of a packet arrival.

The present invention can be applied to a system including a plurality of devices or an apparatus including one device.

Further, the present invention is not limited to the apparatus and the method for realizing the above-described exemplary embodiment.

For example, the present invention also includes a storage medium that provide a computer (central processing unit (CPU) or micro processing unit (MPU)) in the above system or apparatus with program code of software for realizing the above-described exemplary embodiment to execute it. Further, the present invention also includes a case in which the computer in the above-described system or apparatus controls the above-described various devices according to the program code to realize the above-described exemplary embodiments.

In this case, the program code itself, which is read out from the storage medium, implements the functions of the embodiments described above, and accordingly, the storage medium storing the program code constitutes the present invention.

As the storage medium for supplying such program code, a floppy disk, a hard disk, an optical disk, a magneto-optical disk (MO), a CD-ROM, a compact disc recordable (CD-R), a compact disc rewritable (CD-RW), a magnetic tape, a non-volatile memory card, a ROM, and a digital versatile disc (DVD (a DVD-recordable (DVD-R) or a DVD-rewritable (DVD-RW)), for example, can be used.

In addition, the functions according to the embodiments described above can be implemented not only by executing the program code read by the computer, but also implemented by the processing in which an operating system (OS) or the like carries out a part of or the whole of the actual processing based on an instruction given by the program code.

Furthermore, the present invention also includes the case in which a CPU or the like provided on a function expansion board of a computer executes a part or the whole of the processing based on a command of the above-described program code stored in a memory provided on the function expansion board.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2007-298172 filed Nov. 16, 2007, which is hereby incorporated by reference herein in its entirety.

What is claimed is:

1. A video processing apparatus comprising:
   a packet generation unit configured to receive a frame of video data, to divide the frame into tiles, and to packetize each of the tiles;
   a setting unit configured to set a processing time of each packet generated by the packet generation unit;
   a processing unit configured to perform high image quality processing on each packet;
   a measurement unit configured to measure a processing time of the image processing performed by the processing unit;
   a determination unit configured to determine any mode from among a plurality of modes each of which has a different processing speed of the processing unit based on a result of comparison between the processing time of each packet set by the setting unit and the processing time measured by the measurement unit; and an output unit configured to combine the packets processed by the processing unit to output video data.

2. The video processing apparatus according to claim 1, wherein, when the processing time of a packet measured by the measurement unit exceeds the processing time of the packet set by the setting unit, the determination unit is configured to change a mode of the processing unit for processing a subsequent packet.

3. The video processing apparatus according to claim 2, wherein the determination unit is configured to change the mode of the processing unit to a processing speed corresponding to a time by which the processing time of a packet measured by the measurement unit exceeds the processing time of the packet set by the setting unit.

4. The video processing apparatus according to claim 1, wherein the processing unit includes a plurality of processing units configured in a pipeline structure.

5. A method for controlling a video processing apparatus, the method comprising:

receiving a frame of video data, dividing the frame into tiles, and packetizing each of the tiles;

setting a processing time of each generated packet;

performing high image quality processing on each packet;

measuring a processing time of the image processing;

determining any mode from among a plurality of modes each of which has a different a processing speed of the image processing based on a comparison between the set processing time of each packet and the measured processing time; and combining the processed packets to output video data.

6. A non-transitory computer-readable storage medium storing a computer program for causing a computer to execute a method according to claim 5.

* * * * *